US005595088A

United States Patent [19]
Horner

[11] Patent Number: 5,595,088
[45] Date of Patent: Jan. 21, 1997

[54] LIQUID LEVEL MONITORING SYSTEM FOR UNDERGROUND STORAGE TANKS AND METHOD FOR ITS INSTALLATION

[75] Inventor: Jack R. Horner, Bay City, Mich.

[73] Assignee: Horner Creative Products, Inc., Bay City, Mich.

[21] Appl. No.: 241,350

[22] Filed: May 11, 1994

[51] Int. Cl.$^6$ ..................................................... G01F 23/28
[52] U.S. Cl. ..................................... 73/290 V; 73/290 R
[58] Field of Search ............................... 73/290 V, 313, 73/290 R

[56] References Cited

U.S. PATENT DOCUMENTS

| | | | |
|---|---|---|---|
| 3,738,531 | 6/1973 | Mitchell | 222/52 |
| 3,922,008 | 11/1975 | Stiner et al. | 285/41 |
| 3,958,313 | 5/1976 | Rossborough | 29/157 R |
| 4,094,537 | 6/1978 | Lyall | 285/47 |
| 4,220,047 | 9/1980 | Mauboussin | 73/313 |
| 4,231,250 | 11/1980 | Leber | 73/290 V |
| 4,462,249 | 7/1984 | Adams | 73/40.5 A |
| 4,672,842 | 6/1987 | Hasselmann | 73/49.2 |
| 4,831,878 | 5/1989 | Hayashi et al. | 73/313 |
| 4,852,054 | 7/1989 | Mastandrea | 364/509 |
| 4,984,449 | 1/1991 | Caldwell et al. | 73/290 V X |
| 4,999,900 | 3/1991 | Anderson | 29/407 |
| 5,216,914 | 6/1993 | Horner | 73/49.2 |
| 5,325,896 | 7/1994 | Koch et al. | 141/59 |

OTHER PUBLICATIONS

"Red Jacket's Submersible Solvent Pump" Form No. 5174–Mar./1981.
Red Jacket Pumps, P.O. Box 3888, Davenport, Iowa 52808 –Publication date unknown, but prior art.
Horner Creative Products, Inc. publication –publication date unknown, but prior art.

Primary Examiner—William A. Cuchlinski, Jr.
Assistant Examiner—Willie Morris Worth
Attorney, Agent, or Firm—Learman & McCulloch

[57] ABSTRACT

A liquid level monitoring system for underground storage tanks includes a submersible monitoring pipe having telescoping sections that are spring biased to an extended position enabling the pipe to be self-mounted within the tank between its upper and lower walls adjacent to and offset axially from a selected axis opening in the tank, such as the discharge opening which normally accommodates the pump for the tank. The pipe houses an electronic level sensor which is coupled to an above ground control system via conductor wires. A tank adapter is secured to the tank opening and provided with a passage through which the conductor wires extend for routing out of the tank without interfering with the clearance normally provided for insertion and removal of the pump.

30 Claims, 3 Drawing Sheets

LIQUID LEVEL MONITORING SYSTEM FOR UNDERGROUND STORAGE TANKS AND METHOD FOR ITS INSTALLATION

This invention relates to liquid level monitoring systems for monitoring the level of liquid in underground storage tanks and also methods for installation of such monitoring devices in such underground storage tanks.

BACKGROUND OF THE INVENTION

Underground storage tanks of the above type are commonly employed for the storage of highly vaporous liquids, such as gasoline at gasoline service stations. The tanks are typically buried in the earth below the frost line. Such tanks typically have access openings through their top walls to which a riser tube is coupled and extends upwardly from the buried tank into a manhole to permit filling of the tank. A similar access opening and riser tube is provided for admitting a submerged pump device extending vertically from the riser tube to the lower portion of the tank for pumping liquid from the tank to an above ground elevation. It is also common to provide the tank with additional access openings for a vent tube and a vapor recovery line. Each of the access openings thus has a dedicated singular usage necessitating that the opening remain unencumbered with devices such as a liquid level monitoring system.

Previously, it has been known to provide such underground storage tanks with liquid level monitoring devices, however, most such known devices are mounted in one of the aforementioned access openings in such manner as to inhibit or prevent normal usage of such access opening for which it was dedicated when the level sensing system is in place. U.S. Pat. No. 4,999,900 provides a liquid level monitoring system that can be mounted in the riser pipe of the fill tube while permitting normal usage of the fill tube, but limits the type and particularly the size of the monitoring system that may be used.

SUMMARY OF THE INVENTION

Liquid level monitoring apparatus of the present invention comprises a liquid level monitoring pipe housing a liquid level sensing device near its lower end for sensing the level of liquid contained in an underground tank. A mounting device is provided for supporting the pipe vertically within the storage tank between the upper and lower walls of the tank in a position adjacent to but offset from a selected access opening of the tank which is dedicated for normal usages other than an access opening for occupation by a liquid level sensor. The offset mounting of the pipe keeps the associated access opening substantially unencumbered to permit normal usage of the access opening when the monitoring apparatus is in place.

According to another aspect of the invention, a method of installing such a liquid level monitoring system in an underground storage tank is provided wherein the system includes a liquid level monitoring pipe, having telescopic portions that are extendible relative to one another to enable adjustment of the length of the pipe, and having a spring device acting therebetween to constantly urge the members to an expanded position. The method involves adjusting the extensibility of the pipe so that the end-to-end length of the pipe is relatively greater than the spacing between the top and bottom walls of the tank, inserting the pipe into the tank through the selected access opening after which the spring is compressed to shorten the length of the pipe to allow the pipe to be fitted between the top and bottom walls of the tank in a vertical position offset from the associated access opening. The bodily compressive force is thereafter released enabling the spring to bias the ends of the telescopic members into retaining engagement with the top and bottom walls of the tank to thereby support the pipe within the tank.

The apparatus and method of this invention provides a simple, commercially viable method and system for monitoring the liquid level in underground storage tanks. It is easy to use and permits the mounting of the liquid level monitoring device within the confines of the tank adjacent the access opening through which it was inserted so as to keep the access opening clear and unencumbered for its intended usage and without requiring modification to the existing tank structure.

Other objects and advantages of the invention will become apparent with reference to the accompanying drawings and the accompanying descriptive matter.

DETAILED DESCRIPTION

Figure 1:
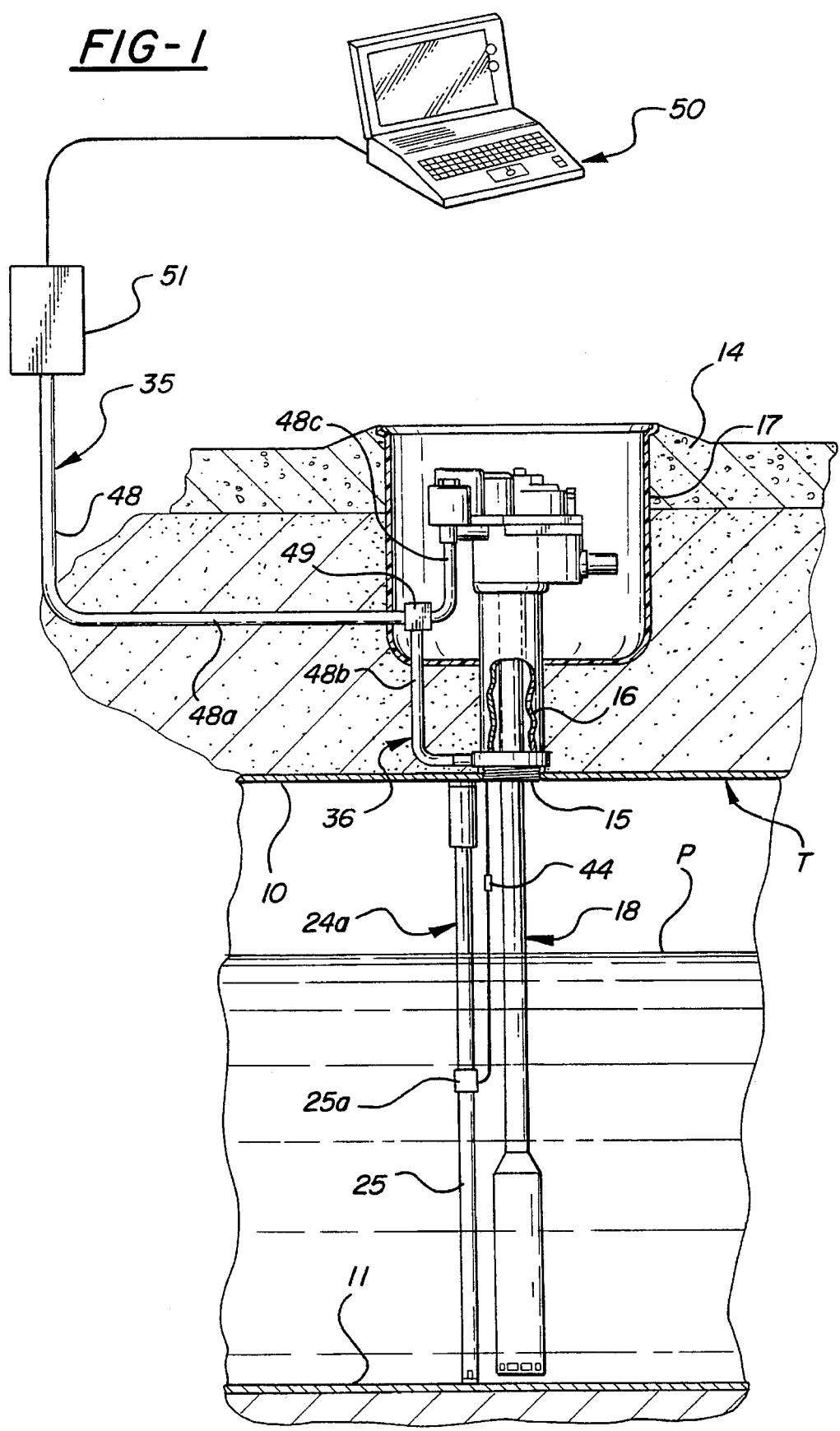
FIG. 1 is a schematic end elevational view illustrating a liquid level monitoring apparatus constructed according to a first embodiment of the invention.
Figure 2:
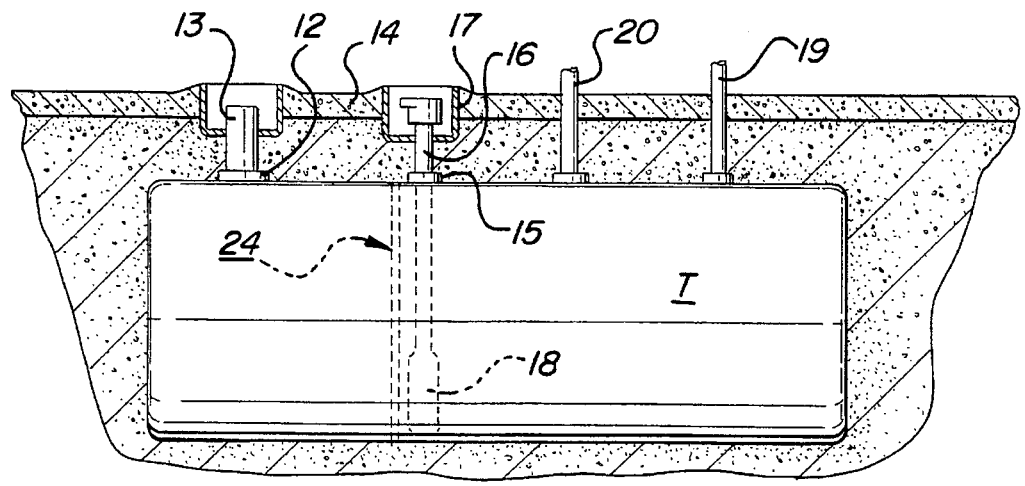
FIG. 2 is a schematic elevational view of the tank illustrating its various access openings and the relative placement of the liquid level monitoring device.

A conventional underground storage system of the type commonly used for the storage of petroleum products, such as gasoline, includes an underground liquid storage tank T of conventional construction which is shown as being buried underground as it would be in a typical gasoline service station. The cylindrical tank T has spaced top and bottom walls or wall portions 10, 11 and is provided with various access openings through the top wall which are dedicated for a particular usage (FIG. 2). The tank T is filled with product through a fill opening 12 shown coupled to a riser tube 13 extending upwardly from the top of the tank T into a manhole recessed in the concrete apron 14 of the service station. Removal of the product from the tank is provided through a separate discharge opening 15 coupled to which is a similar riser tube 16 extending upwardly from the tank T to a similar manhole 17. The riser tube 16 mounts a submersible pump 18, shown best in FIG. 1, which extends through the opening 15 into the interior of the tank T and is submerged below the level of the product P contained within the tank. The tank T typically includes two additional tank accessing riser 19 and 20 to which a vent pipe 21 and a vapor recovery line 22 are coupled, respectively, for venting the tank and recovering product vapors in a conventional manner.

The present invention provides a fluid level monitoring system or apparatus generally designated 24 for use with such underground storage tanks T for the purpose of continually monitoring the level of the product within the tank T. As will be described in greater detail, the level monitoring system is constructed and installed within the tank in such manner as to permit normal operation of the underground storage system, including the filling and dispensing of product from the tank, while the monitoring system is in place within the tank.

Figure 3:
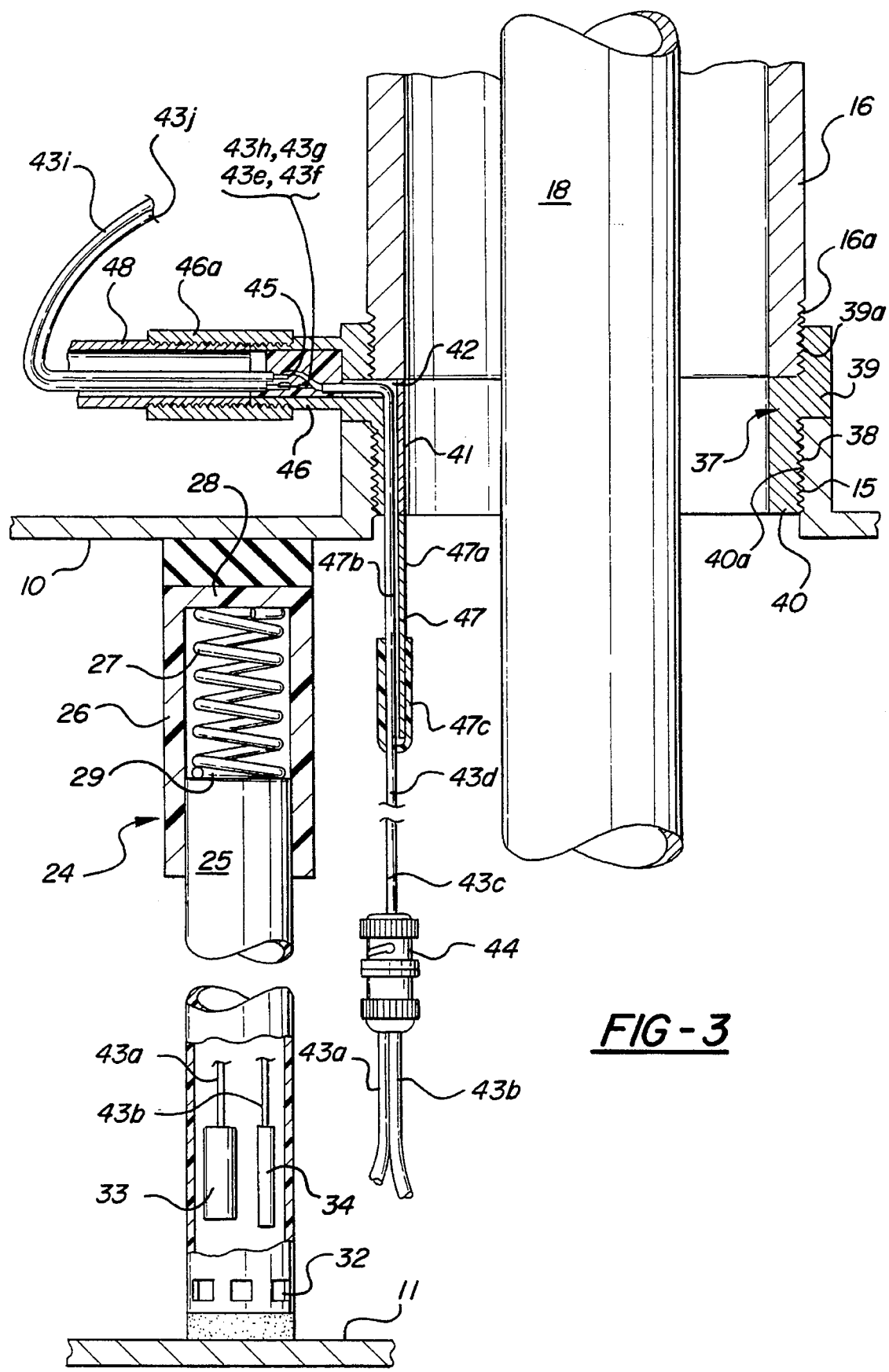
FIG. 3 is an enlarged sectional view showing a portion of the liquid monitoring device of FIG. 1.

The apparatus 24 includes a liquid level monitoring pipe 24a adapted for vertical mounting within the tank T adjacent a selected one of the aforementioned access openings. FIGS. 1 and 3 illustrate a pipe constructed in accordance with a first embodiment of the invention which is shown mounted within the tank T adjacent the discharge opening 15 alongside the pump 18.

The pipe or pipe assembly 24a has a telescoping construction provided by a lower tubular section 25 whose upper end is fitted slideably within the lower end of a relatively larger diameter upper tubular section 26. The pipe sections 25, 26 are fabricated from a material that resists attack from the liquid product, such as schedule 80 PVC plastic tubing.

Fitted within the upper pipe section 25 is a helical coil compression spring 27 whose upper end engages a spring seat 28 on the upper pipe section 25 and whose lower end engages a spring seat 29 provided by the closed upper end face of the lower pipe section 26. The spring 27 which constitutes a form of biaser urges the pipe sections 25, 26 constantly apart toward an expanded condition, but permits the sections 25, 26 to be moved together against the compressive force of the spring so as to place the sections 25, 26 in a shortened, spring-loaded condition. This spring-loaded telescopic construction enables the pipe 24 to be self-mounted vertically within the tank T, as illustrated in FIGS. 1 and 3, wherein the spring 27 acts between the sections 25, 26 to urge their free ends into engagement with the upper and lower walls 10, 12 of the tank T with a force sufficient to retain the pipe in position within the tank.

Preferably, the free ends of the pipe sections 25, 26 are provided with end cushions or pads 30 and 31 that are fabricated from a material that is relatively pliable and resilient, such as the synthetic rubber, neoprene, to enhance the frictional gripping force between the pipe 24 and tank. The material selected for the pads should also be one that resists attack from the liquid product contained within the tank T and cannot cause sparks when the pipe sections are installed in position.

The lower end of the pipe 24 is provided with one or more slots or openings 32 for admitting the liquid product into the interior of the pipe 24. The pipe 24 serves to isolate the liquid therein from the environment within the tank, which typically may be somewhat turbulent when liquid is being added to or removed from the tank.

Housed within the pipe 24 adjacent the lower end is a liquid level sensor 33, and preferably also a liquid temperature sensor 34, provided respectively for sensing the level and temperature of the liquid in the tank T. The sensors 33, 34 preferably are electronic devices with the level sensor 33 being preferably an ultrasonic device and the temperature sensor being preferably a thermocouple device, both types of which are familiar to those skilled in the art and available, commercially, respectively, from Cosense, a company resident in Hauppauge, N.Y., U.S.A. and Omega, a company resident in Stamford, Conn., U.S.A.

Various sensor types are available and will also work well such as those disclosed in U.S. Pat. Nos. 4,852,054 and 4,999,900. The sensors 33, 34 are coupled electronically to an above-ground electronic process control system, generally designated 35, via a connecting wire system generally designated 36. The connecting wire system 36 includes a ring-shaped tank adapter ring, generally designated 37, (FIG. 3) designed to be mounted on the tank T between the selected access opening and its associated riser tube or pipe. As illustrated best in FIG. 3, the discharge opening 15, has an internally threaded flange portion 38 that, in prior art systems, is threaded to mate with the externally threaded coupling portion 16a of the riser tube 16. The tank adapter 37 of the present invention has an upper end coupling portion 39 with internal threads 39a of the same thread configuration as that of the tank flange 38, and a lower end coupling portion 40 having external threads 40a of the same thread configuration as that of the riser tube coupling portion 16a. In this way, the adapter 37 is able to be coupled to both the access opening 16 and riser tube 17 without modification of either the upstanding flange 38 of the tank T or the coupling portion 16a of the riser tube 16.

The tank adapter ring 37 has a central opening 41 that is of the same inner diameter as that of the riser tube (typically four inches) and includes another separate passage 42 that extends longitudinally upwardly through the wall of the lower coupling portion 40 and then radially outwardly at a right angle through the wall of the upper coupling portion 39, such that the passage 42 communicates at its opposite ends with the interior and exterior of the tank T when the adapter 37 is mounted on the tank T.

The connecting wire system 36 also includes a pair of coaxial cables 43a, 43b that lead from the sensors 33, 34, up through the passage 42 of the adapter 37, and are coupled to the above-ground control system 35. The cables preferably extend from the sensors 33, 34 up through the pipe 24 to exit at a coupling 25a which couples the two pipe sections comprising pipe 25, and are releasably coupled at their opposite ends to a pair of coaxial cable sections 43c and 43d by a separable electrical coupling 44. The coaxial cables 43c and 43d extend into the passage 42 and each is united at its opposite end to separate pairs of wires 43e, 43f and 43g, 43h at a junction 45 within the confines of an externally threaded pipe coupling 46 that projects radially outwardly from the adapter 37 at the exit of the passage 42. The wires 43e and 43f, and 43g, 43h are then protected by wire casings 43i and 43j respectively. The coupling 46 is filled with silicone rubber or other suitable material to seal the passage 42 fluid tight.

A rigidifying guard or guide member 47 is welded or otherwise secured to the lower coupling portion 40 and extends downwardly therefrom into the interior of the tank to a free end. The guard member 47 is constructed preferably from ductile metal strip of material, such as brass, that enables the guard to be bent without breaking. The guard 47 has a radially inner side surface 47a and an outer side surface 47b. The cable wires 43c, 43d are secured by insulative tape 47c to extend along the outer side surface 47b of the guard member 47 and thereby are shielded from contact with equipment, such as the pump 18, that under normal conditions may be inserted and withdrawn into the tank through the discharge opening 15.

The connecting wire system 36 also includes an underground conduit, generally designated 48 interconnecting the process control system 35, the pump 18, and the tank adapter 37. In the section of conduit 48a extending between the process control system 35 and the pump 18, there is provided a junction tee or part 49 mounted within the manhole 17 for the pump 18. Another section of conduit 48b extends between the junction tee 49 and the adapter 37. As shown in detail in FIG. 3, the conduit section 48b may be joined to the threaded adapter coupling 46 by an internally threaded sleeve 46a. The conductor wires 43e, 43f and 43g, 43h extend through the conduit section 48b and then into the conduit section 48a through the junction 49 to the process control system 35 along with additional wires (not shown) conventionally provided between the process control system and the pump and extending through the conduit section 48c.

The process control system 35 includes a computer 50 and an electronic interface 51 connected in the wire system 36. The present system is of the type where the thermocouple sensor 34 measures the temperature of the liquid in the tank and transmits this information to the computer which knows what the liquid in the tank is. The computer 50 using this information sends a signal to the interface 51 which adjusts the signal sent by the ultrasound sensor 34 which measures the speed of sound waves through the liquid in the tank and so compensates for the density of the liquid in the tank which varies with the actual temperature of the liquid in the tank. The interface then feeds a consequent modified electrical signal back to the computer which stores and records it on a continuous basis. Systems which perform in this manner are well known in the art and the present inventor makes no claim to having invented them. The computer 50 preferably is any suitable personal computer such as an IBM model 386SX. The interface computer system 51 is available from the previously mentioned Cosense Company or from the previously mentioned Omega Company. The recorded information may be displayed on the computer screen 52, stored on a disk, or be transmitted to a printer (not shown) if desired. The computer 50 may be coupled electronically to the pump meter so as to be able to monitor and record the product output of the pump. The product removal transactions, as recorded from the sensors 33 and 34, and those provided by monitoring the output of the pump 18, may be compared as a double check.

THE OPERATION

The installation and operation of the system is as follows. The pipe 24 is selected according to the diameter of the tank T such that the end-to-end length of the upper and lower sections 25 and 26, when fully extended by the spring 27, are relatively longer than the dimension of the tank between its upper and lower wall portions 10 and 11. An access opening to the tank is selected for insertion of the pipe 24—the discharge opening 16 being illustrated in the drawings. The pipe 24 is inserted through the opening 15 into the interior of the tank T and the upper section 25 is telescoped bodily toward the lower section 26 to compress the spring 27 and thereby shorten the end-to-end length of the pipe 24 sufficiently to allow it to be positioned vertically within the tank between the upper and lower wall portions 10 and 11 at a location adjacent to but offset radially from the opening 15, as illustrated best in FIGS. 1 and 3. The compression force may then be released, causing the spring 27 to force the upper and lower sections 25 and 26 into retaining biased engagement with the upper and lower wall portions 10 and 11 of the tank T to thereby self-support the pipe 24 within the tank T. The section 25 engages the immediately marginal interior surface of the wall 10 surrounding access opening 15.

Once the pipe 24 is positioned within the tank T, the adapter 37 may be threaded into the tank flange 38 and the riser tube 17 threaded into the adapter 37. The conduit section 48b may then be installed between the adapter 37 and the junction 49 allowing the conductor wires to be threaded through the conduit 48 for connection with the process control system 35.

The guard member 47 may then be positioned to support the wires out of the path of the equipment being inserted through riser tube 16 and adapter access opening 41. This permits the access opening 15 to be utilized for its intended purpose which, in the example, is for the accommodation of the pump 18. Product removal transactions may then be monitored by the sensors 33 and 34 during normal usage of the storage tank system as described above, to monitor the level of product in the tank T.

Figure 4:
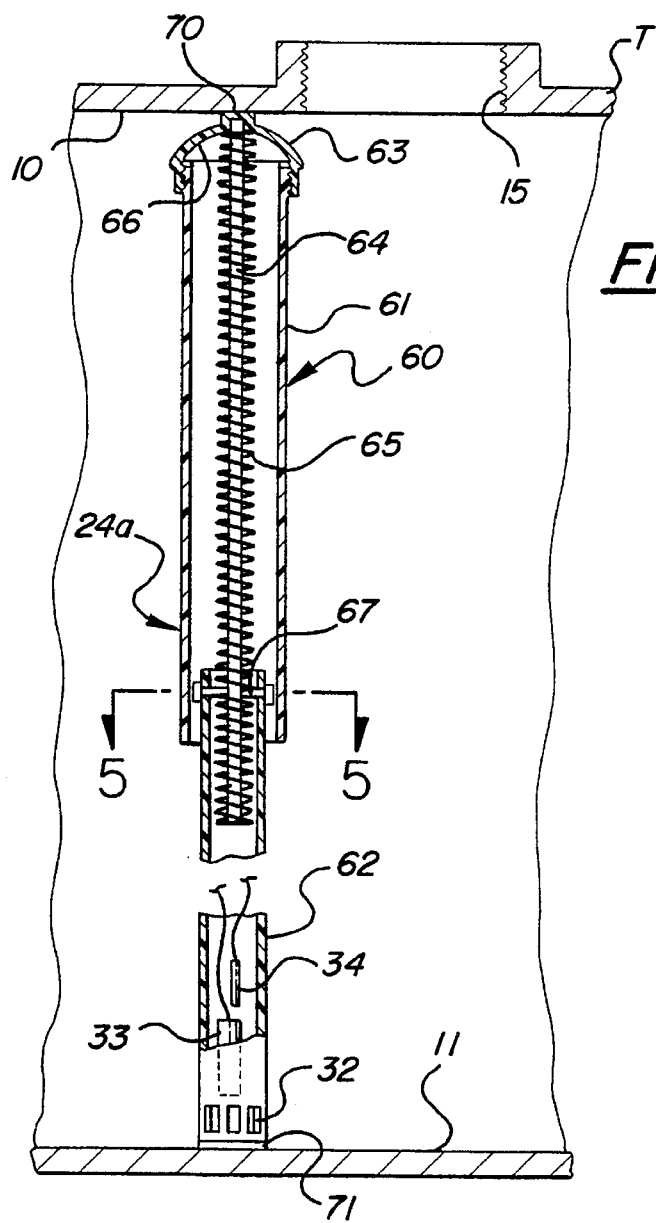
FIG. 4 is a fragmentary elevational view, shown partly in section, illustrating an alternative embodiment of the liquid level monitoring device.
Figure 5:
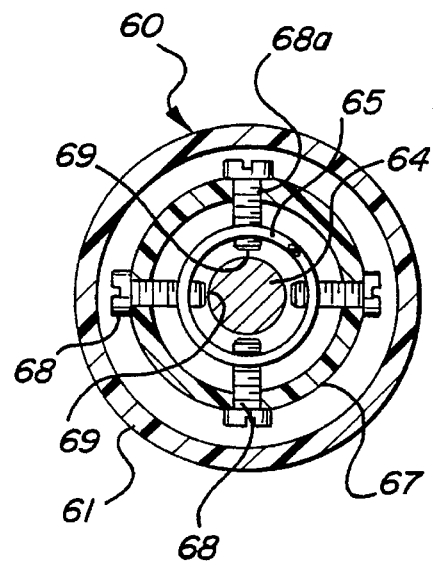
FIG. 5 is an enlarged sectional view taken on the line 5—5 of FIG. 4.

FIGS. 4 and 5 illustrate a second, and preferred embodiment of a liquid level monitoring pipe, generally designated 60. Like the first embodiment, the pipe 60 has upper and lower telescoping sections 61, 62 of tubular construction and is fabricated of the same material. The upper tubular section 61 is slideable longitudinally over the lower tubular section 62 to thereby permit adjustment of the overall end-to-end length of the pipe 60. The upper section 61 is fitted at its upper end with a separable internally threaded cap 63, secured to which is a rod 64 extending coaxially with the upper section 61 downwardly into the lower tubular section 62 through the open upper end of the lower section 62. An elongate helical coil compression spring 65 encircles the rod 64 and confronts a spring seat surface 66, at its upper end provided on the cap 63, and also another spring seat, generally designated 67, provided on the lower tubular section 62. The spring seat 67 is designed to enable adjustment in the length of spring 65 provided between the spring seats 66 and 67 in order to adjust the extensibility of the tubular sections 61 and 62.

As shown best in FIG. 5, the spring seat 67 comprises a plurality of pins and preferably pin head machine screws 68 constituting radial projections that are threaded through threaded apertures 68a in the wall of the lower tubular section 62, adjacent its upper end, in coplanar relation to one another, and which terminate at free ends 69 that are spaced from one another to provide sufficient radial clearance for the passage of the rod 64. However, the free ends 69 extend sufficiently far into the lower tubular section 62 so as to be accommodated within the space between adjacent coils of the spring 65, as illustrated in FIGS. 4 and 5. The extensibility of the pipe 60, prior to insertion into the tank, may be adjusted externally of the tank by removing the cap 63 and rod 64, and revolving the spring 65 in one direction or the other with respect to the screws 68, which act like mating screw threads with the helical coils of the spring, to increase or decrease the length of the spring above the screws 68. Once the sections 61 and 62 are adjusted, the rod 64 may be extended back through the spring 65 and the cap 63 reattached to the upper pipe section 61.

The opposite ends of the pipe 60 may be provided with end cushions or pads 70 and 71 and inlet openings 32 near the bottom of the lower tubular section 62 as in the first embodiment of the invention. The same level and temperature sensors 33 and 34 and the associated wiring system, including the tank adapter 37 may be employed with the second embodiment in the same manner as that described for the first embodiment.

The installation of the pipe 60 is similar to that described for the first embodiment in that it is inserted through a selected access opening, such as the discharge opening 15, and mounted vertically within the tank T adjacent to, but offset axially from, the riser 16 to keep the opening free and unencumbered so that it may be used for its intended purpose, such as the accommodation of the pump 18. To install the pipe 60, its length is adjusted to be relatively longer than that of the spacing between the top and bottom walls 10 and 11 of the tank. For instance, to lengthen the pipe as illustrated in FIG. 4, the cap 63 is detached from the upper section 61 and the rod 64 withdrawn from the spring after which the spring 65 may be rotated clockwise to advance additional coils or winds of the spring above the pin seats 68. The rod and cap may be reattached and the pipe 60 inserted into the tank T through the selected access opening after which the upper section 61 may be bodily slid toward the lower tubular section 62 to thereby compress the spring 65 between the upper and lower seats 66 and 67 to enable positioning of the pipe 60 vertically within the tank between the upper and lower wall portions 10 and 11 offset from the opening 16. The compressive force of spring 65 may thereafter be released causing it to urge the upper and lower sections 61 and 62 into engagement with the tank wall portions 10 and 11 to thereby self-support the pipe 60 within the tank T, as illustrated in FIG. 4. The tank adapter 37 may then be installed as described previously and the product level monitored in the same manner as that described for the first embodiment of the pipe.

The disclosed embodiment is representative of the preferred form of the invention, but is intended to be illustrative rather than definitive thereof. The invention is defined in the claims.

I claim:

1. Liquid level monitoring apparatus in combination with an underground liquid storage tank having upper and lower wall portions and at least one access opening in said upper wall portion, surrounded by a marginal interior surface of said upper wall portion, dedicated for usage other than occupation and consequent blockage by a liquid level sensor, said apparatus comprising:

a liquid level monitoring pipe assembly extending longitudinally between said upper interior marginal surface and lower wall portion just laterally offset from said access opening and incorporating a liquid level sensing device for sensing the level of liquid contained in said tank;

said pipe assembly including telescoping portions movable to a longitudinally spread position; and a yieldable biaser incorporated with said monitoring pipe assembly in a position adjacent to but vertically offset from said access opening so as to keep said access opening substantially unencumbered for maintaining said pipe assembly in longitudinally spread position.

2. The apparatus of claim 1 wherein said biaser comprises a spring acting between said telescoping portions urging them toward relative prolongation of one another into retaining engagement with said upper and lower wall portions of said tank.

3. The apparatus of claim 2 wherein said spring comprises a compression coil spring and each of said telescoping portions is provided with a spring seat engaging said compression spring at longitudinally spaced locations along the length of the spring.

4. The apparatus of claim 3 wherein one of said spring seats engages said spring intermediate its ends and in such manner as to permit selective longitudinal adjustments of said spring relative to said one spring seat to effectuate adjustment in the length of spring between said seats to thereby enable adjustment in the extensibility of said monitoring pipe.

5. The apparatus of claim 4 wherein said coil spring has helically wound coils and said one spring seat extends between adjacent coils of said spring so as to permit said longitudinal adjustment of said spring by rotating said spring relative to said one spring seat.

6. The apparatus of claim 1 wherein said level sensing device includes a conductor wire system for coupling with an above-ground electronic indicator system.

7. The apparatus of claim 6 including an adapter ring secured to said access opening, said adapter ring having a central opening aligned with said access opening and a secondary passage extending into a side wall of said adapter ring from above said access opening and downwardly through said access opening radially outwardly of said central opening, said conductor wire system leading from said level sensing device upward through said adapter ring passage to the exterior of said tank.

8. The apparatus of claim 7 wherein said adapter ring includes a guard member projecting from the lower end of said adapter ring adjacent said passage, said guard having an inner surface facing toward said central opening and an outer surface facing away from said central opening, said conductor wire system extending along said outer surface of said guard to thereby be shielded during installation and removal of equipment through said central opening.

9. The apparatus of claim 7 wherein said access opening has a coupling portion of predetermined configuration and includes a separable riser tube having a lower end coupling portion of predetermined configuration, said adapter having a lower coupling portion configured to mate with said coupling portion of said access opening and an upper coupling portion configured to mate with said coupling portion of said riser tube for securing said riser tube to said access opening without modification of either said coupling portions of said access opening and riser tube.

10. The apparatus of claim 6 wherein said indicator system includes a computer for registering and recording liquid removal transactions.

11. Liquid level monitoring apparatus in combination with an underground liquid storage tank having an upper wall portion with an access opening therein which is available to above ground access and an upper marginal interior wall surface surrounding said opening, said tank further having a lower wall portion said apparatus comprising a removable longitudinally contractible liquid level monitoring telescopic pipe assembly, extending longitudinally between said upper and lower wall portions of said tank in operative clamped engagement with said upper interior marginal wall surface laterally adjacent to but laterally offset from said opening, said pipe assembly including a liquid level sensing device therein adjacent said lower end for sensing the level of liquid contained in said tank, said pipe having telescoping portions extendable in relative prolongation of one another to alter the effective overall end-to-end length of said pipe, and a spring device acting constantly between said telescoping portions to urge said portions toward an expanded position to enable said pipe to be mounted vertically within the underground tank by positioning said telescoping portions in spring biased engagement with the top and bottom walls of the tank.

12. The apparatus of claim 11 wherein said spring device comprises a compression coil spring normally urges said telescoping portions apart, and each of said telescoping portions is provided with a spring seat engaging said compression spring at longitudinally spaced locations along the length of the spring.

13. The apparatus of claim 12 wherein said coil spring has helically wound coils and one of said spring seats extends between adjacent coils of said spring so as to permit longitudinal adjustment of the portional length of said spring extending between said seats by rotating said spring relative to said one spring seat.

14. In a product level monitoring system in combination with an underground storage tank for use in continuously registering the level of liquid in said underground storage tank, the tank having upper and lower walls and a vertically axially extending riser with an access riser opening in the upper wall of the tank, surrounded by an upper wall marginal interior surface, for gaining access to the tank from an above ground elevation;
   a) a removable, longitudinally extending pipe assembly carrying a liquid level sensor disposed within said tank vertically between said upper marginal interior surface and lower wall laterally adjacent to but laterally offset from said riser and riser opening;
   b) wherein said pipe assembly includes telescoping members, and a biasing device urges said members to an expanded position to maintain the pipe assembly in captured position between the upper and lower walls of said tank;
   c) a connector wire system including sensor conductors leading from said sensor and pipe assembly up through said pump riser opening; and
   d) an electronic control system above ground to which said connector wire system is coupled to enable the determination of the liquid level in the tank.

15. The monitoring system of claim 14 wherein said electronic control system includes a computer for registering liquid removal transactions.

16. The monitoring system of claim 15 wherein said determination is a printout.

17. The monitoring system of claim 15 wherein said determination is displayed on a video screen.

18. The monitoring system of claim 14 wherein said connector wire system includes an adaptor which secures to the riser at said access opening and which has a passage leading from inside the riser access opening to the exterior thereof, and said sensor conductors lead from said sensor up through said passage.

19. The monitoring system of claim 14 wherein said telescoping members comprise a lower tube with an upper end received within a lower end of an upper tube, the sensor being disposed in a lower end of the lower tube and the lower end of the lower tube having vertically extending slots therein.

20. The monitoring system of claim further includes means for supporting a rod within said upper tube and said biasing device is a coil spring received on said rod, said upper and lower tubes having spring seats at their upper ends between which said coil spring is compressed.

21. The monitoring system of claim 20 wherein said spring seat at the upper end of said lower tube comprises opposing radial projections extending interiorly into said lower tube to leave a central lateral gap between them.

22. The monitoring system of claim 21 wherein said spring is of greater diameter than said gap and extends downwardly through said gap.

23. The monitoring system of claim 22 wherein the axial position of a portion of the spring extending downwardly is adjustable beyond said gap with respect to said radial projections.

24. The monitoring system of claim 18 in which the tank access opening is interiorly threaded and the riser is exteriorly threaded and said adaptor includes a lower skirt portion which is exteriorly threaded to be received in said tank access opening and an upper portion of larger diameter which is interiorly threaded to receive the riser.

25. In a method of installing a liquid level monitoring system in an underground storage tank having upper and lower walls spaced a predetermined distance from one another and at least one access opening in the upper wall dedicated for normal usage as other than an access opening for occupation by a liquid level sensor; the liquid level monitoring system including a liquid level monitoring pipe extending longitudinally between upper and lower ends and housing a liquid level sensing device adjacent said lower end for sensing the level of liquid contained in the tank, the pipe having telescoping members extendable in relative prolongation of one another to alter the effective overall end-to-end length of the pipe, and a spring device acting constantly between the telescoping members to urge the members toward an expanded position to enable the pipe to be mounted vertically within the underground tank by positioning the telescoping members in spring biased engagement with the top and bottom walls of the tank, said method comprising the steps of:
   adjusting the extensibility of said pipe so that the end-to-end length of said pipe is relatively greater than that of the spacing between said top and bottom walls of said tank;
   inserting said pipe into said tank through said access opening;
   bodily compressing said spring to shorten the end-to-end length of said pipe sufficiently to permit the positioning of said pipe vertically within said tank between said top and bottom walls and offset from said access opening;
   releasing the bodily compressive force on said spring enabling the spring to bias the ends of said telescoping members into retaining engagement with the top and bottom walls of said tank to thereby support the pipe within said tank.

26. The method of claim 25 wherein the level sensing device has conductor wires which extend through a passage provided in an adapter ring between its ends, said method further comprising the steps of securing one end of the adapter ring to the access opening and securing the other end of the adapter ring to a riser tube projecting above the tank, and coupling the conductor wires to an electronic indicator system above to enable the determination of the liquid level in the tank.

27. The method of claim 26 wherein the adapter ring has opposite upper and lower ends, said method further comprising the steps of: securing one end of the adapter ring to said access opening without having to modify said access opening and securing the opposite end of said adapter ring to said riser tube without having to modify said riser tube.

28. In a method of installing a liquid level monitoring system in an underground storage tank having upper and lower walls spaced a predetermined distance from one another and at least one access opening in the upper wall dedicated for usage other than for occupation and blockage by a liquid level sensor; the liquid level monitoring system including a liquid level monitoring pipe extending longitudinally vertically between said upper and lower walls;
   a liquid level sensing device carried by said pipe, the pipe having telescoping members, extendable in relative prolongation of one another to alter the effective overall end-to-end length of the pipe, biased to urge the members toward an expanded position to enable the pipe to be mounted vertically within the underground tank by positioning the telescoping members in biased engagement with the top and bottom walls of the tank, said method comprising the steps of:
   adjusting the extensibility of said pipe so that the end-to-end length of said pipe is relatively greater than that of the spacing between said top and bottom walls of said tank;
   bodily compressing said pipe telescoping members to shorten the end-to-end length of said pipe sufficiently to permit the positioning of said pipe vertically within said tank between said top and bottom walls offset from said access opening; and positioning the pipe and releasing the bodily compressive force to bias the ends of said telescoping members into retaining engagement with the top and bottom walls of said tank just laterally offset from said access opening to thereby support the pipe within said tank.

29. In a method of installing a liquid level monitoring system in an underground storage tank having upper and lower walls spaced a predetermined distance from one another and at least one access opening in the upper wall surrounded by an interior immediately marginal wall surface dedicated for usage other than for occupation and blockage by a liquid level sensor; the liquid level monitoring system including a liquid level monitoring pipe assembly within said tank extending longitudinally vertically between said lower wall and said interior marginal wall surface; and a liquid level sensing device carried by said pipe assembly, the pipe assembly having longitudinally expansible and contractible portions, extendable in relative prolongation of one another to alter the effective overall end-to-end length of the pipe assembly, biased to urge the members toward an expanded position to enable the pipe assembly to be mounted vertically within the underground tank by positioning the pipe assembly in biased engagement between the top and bottom walls of the tank, said method comprising the steps of:

bodily compressing said pipe assembly to shorten the end-to-end length of said pipe assembly sufficiently to permit the positioning of said pipe vertically within said tank between said top and bottom walls laterally offset from said access opening and positioning the pipe laterally offset from said access opening between said lower wall and said interior marginal wall surface; and releasing the bodily compressive force and biasing the said portions of said pipe assembly into operative engagement with said bottom wall and said marginal wall surface of the upper wall of said tank just laterally offset from said access opening to thereby support the pipe vertically within said tank.

30. The system of claim 11 wherein an adaptor ring is supported at said access opening and extends upwardly in axial alignment therewith, said adaptor ring having a first side wall portion with an internal passage therein and a second side wall portion of greater diameter above said first side wall portion having a radial sealed opening therein connecting to said internal passage, and connector wires from said sensing device leading up through said access opening and passage, and out through said radial opening to an above ground location.

* * * * *

UNITED STATES PATENT AND TRADEMARK OFFICE
CERTIFICATE OF CORRECTION

PATENT NO. : 5,595,088
DATED : January 21, 1997
INVENTOR(S) : Jack R. Horner

It is certified that error appears in the above-indentified patent and that said Letters Patent is hereby corrected as shown below:

Column 9, line 41, after "claim" insert -- 19 --.

Signed and Sealed this

Seventeenth Day of June, 1997

Attest:

BRUCE LEHMAN

*Attesting Officer*     *Commissioner of Patents and Trademarks*